United States Patent [19]

Yajima et al.

[11] Patent Number: 4,920,805

[45] Date of Patent: May 1, 1990

[54] PRESSURE SENSOR HAVING BAFFLING MEANS

[75] Inventors: Yasuhito Yajima; Yasushi Watanabe; Kazuyoshi Shibata, all of Nagoya, Japan

[73] Assignee: NGK Insulators, Ltd., Japan

[21] Appl. No.: 268,278

[22] Filed: Nov. 7, 1988

[30] Foreign Application Priority Data

Nov. 27, 1987 [JP] Japan .................................. 62-301147

[51] Int. Cl.$^5$ .......................... G01L 7/08; G01L 9/06
[52] U.S. Cl. ...................................... 73/706; 73/727; 73/756; 338/4
[58] Field of Search ................ 73/706, 707, 708, 756, 73/718, 720, 721, 724, 726, 727, 115; 338/4; 361/283

[56] References Cited

U.S. PATENT DOCUMENTS

| | | | |
|---|---|---|---|
| 2,486,133 | 10/1949 | Egger | 73/707 |
| 3,289,134 | 11/1966 | Laimins et al. | 73/726 |
| 3,581,773 | 6/1971 | Warren | 73/707 |
| 4,311,980 | 1/1982 | Prudenziati | 338/4 |

OTHER PUBLICATIONS

SAE Technical Paper Series, No. 820319.

SAE Paper, No. 860474.

*Primary Examiner*—Donald O. Woodiel
*Attorney, Agent, or Firm*—Arnold, White & Durkee

[57] ABSTRACT

The invention relates to a pressure sensor having a ceramic diaphragm which is exposed at one of opposite surfaces thereof to a measurement fluid in an external space and deformable in response to a pressure of the measurement fluid, and a strain detector for producing an electrical output representative of an amount of deformation of the ceramic diaphragm. The ceramic diaphragm is fixedly supported at an outer portion thereof, so that a central working portion of the diaphragm is deformable in response to the pressure of the measurement fluid applied thereto. The sensor includes a baffling structure disposed adjacent the above-indicated one surface of the ceramic diaphragm. The baffling structure has portions which partially define a chamber to which the above-indicated one surface of the ceramic diaphragm is exposed. The baffling structure has at least one communication hole for communication between the chamber and the external space, such that the central working portion of the ceramic diaphragm is protected against direct exposure to a straightforward flow of the measurement fluid from the external space toward the central working portion of the diaphragm.

8 Claims, 2 Drawing Sheets

PRESSURE SENSOR HAVING BAFFLING MEANS

BACKGROUND OF THE INVENTION

1. Field of the Invention

The present invention relates in general to a ceramic pressure sensor, and more particularly to a ceramic pressure sensor suitable for measuring the pressure within a cylinder of an internal combustion engine, or the pressures in similar environments.

2. Discussion of the Prior Art

There is known a pressure sensor of a type in which suitable strain detector means is provided on a diaphragm which is deformable in response to a pressure applied thereto. Deformation or strain of the diaphragm causes a change in an electrical output of the strain detector means, whereby the pressure applied to the diaphragm can be measured or determined by the output produced by the strain detector means. Recently, examples of this type of pressure sensor are proposed in SAE Reports 820319 and 860474.

In the known pressure sensor of the above-indicated type which employs a ceramic diaphragm, one of opposite major surfaces of the diaphragm directly communicates with the ambient space. Namely, that surface of the diaphragm is directly exposed to the atmosphere to be measured (hereinafter referred to as "measurement atmosphere").

When the pressure sensor is used for measuring the pressure (combustion pressure) within the cylinder bore of an internal combustion engine, for example, the diaphragm directly contacts a relatively hot gas produced in the combustion process of the engine, and a relatively cool gas existing in the intake process of the engine. Described in more detail, the diaphragm is subject to alternate heating and cooling by the combustion and intake gases at relatively short intervals. This causes a difference between the temperatures on opposite sides of the diaphragm, which induces a thermal stress that may result in a certain degree of deformation or deflection of the diaphragm.

When the diaphragm is exposed to the hot combustion gas, the above deflection of the diaphragm due to the thermal stress takes place in a direction opposite to the direction of the deflection of the diaphragm caused by a positive pressure of the measurement gas applied thereto. When the diaphragm is exposed to the relatively cool intake gas, the deflection due to the thermal stress occurs in the same direction as the direction of the deflection caused by the pressure. Accordingly, the pressure as detected by the strain detector means is lower than the actual pressure in the combustion process of the engine, and higher than the actual pressure in the intake process of the engine. Therefore, the pressure sensor suffers from a measuring error which corresponds to the amount of deflection of the diaphragm due to the thermal stress indicated above. Thus, the known pressure sensor is not sufficiently satisfactory in measuring accuracy.

SUMMARY OF THE INVENTION

It is therefore an object of the present invention to provide a pressure sensor having a ceramic diaphragm deformable in response to a pressure of a fluid applied thereto, the pressure sensor being capable of accurately measuring the pressure even when the temperature of the fluid varies to a considerable extent.

The above object may be accomplished according to the principle of the present invention, which provides a pressure sensor having a ceramic diaphragm which is exposed at one of opposite surfaces thereof to a measurement fluid in an external space and deformable in response to a pressure of the measurement fluid, and strain detector means for producing an electrical output, representative of an amount of deformation of the ceramic diaphragm, the pressure sensor comprising a support member for fixedly supporting the ceramic diaphragm at a peripheral portion of the diaphragm, so as to allow a central working portion of the diaphragm to be deformed in response to the pressure of the measurement fluid applied thereto, and a baffling structure disposed adjacent to the one surface of the ceramic diaphragm. The baffling structure includes portions which cooperate with the above-indicated one surface to define a chamber to which the above-indicated one surface of the ceramic diaphragm is exposed. The baffling structure has at least one communication hole for communication between the chamber and an external space, such that the above-indicated one surface of the central working portion of the ceramic diaphragm is protected against direct exposure to a straightforward flow of the measurement fluid from the external space toward the central working portion of the diaphragm.

In the pressure sensor of the invention constructed as described above, the central working portion of the ceramic diaphragm is protected against direct exposure to a straightforward flow of the measurement fluid from the external space toward the ceramic diaphragm. Therefore, the baffling structure minimizes a sudden change in the temperature of the fluid adjacent the surface of the ceramic diaphragm, even if the temperature of the fluid in the external space considerably changes in a short time. Accordingly, the amount of deformation arising from a thermal stress of the ceramic diaphragm due to such a sudden change in temperature is effectively reduced or eliminated, whereby the pressure of the measurement fluid in the external space can be measured or determined with improved accuracy.

The above advantage of the baffling structure enables the instant pressure sensor to accurately measure the pressure of a fluid whose temperature fluctuates or varies to a considerable degree, for instance, the pressure of the fluid within the cylinder bore of an internal combustion engine, in which fluid suddenly changes, alternately, from a relatively hot combustion gas to a relatively cool intake gas and vice versa.

In one form of the present invention, the baffling structure comprises a plurality of baffleplate members which are spaced apart from each other and from the above-indicated one surface of the ceramic diaphragm, in a direction substantially perpendicular to the above-indicated one surface. In this case, the above-indicated at least one communication hole consists of at least one communication hole formed through a thickness of each of the plurality of baffleplate members, such that the above-indicated at least one communication hole formed through one of the baffleplate members is spaced apart from the above-indicated at least one communication hole formed through another of the baffleplate members, in a direction substantially parallel to the above-indicated one surface of the ceramic diaphragm. The plurality of baffleplate members may consist of two baffleplate members. In this instance, one of the two baffleplate members consists of a bottom wall of a housing in which the support member, the ceramic diaphragm and the other baffleplate member are accommodated, and the other baffleplate member divides the chamber into two spaces which communicate with each other through the above-indicated at least one communication hole formed through the other baffleplate member.

In another form of the invention, the baffling structure comprises a single baffleplate member which is spaced apart from the above-indicated one surface of the ceramic diaphragm, in a direction substantially perpendicular to the above-indicated one surface. In this case, the above-indicated at least one communication hole is aligned with a portion of the ceramic diaphragm near the outer portion. In this case, the single baffleplate member may consist of a bottom wall of a housing in which the support member and the ceramic diaphragm are accommodated.

In a further form of the invention, the strain detector means comprises at least one resistor formed on the other of the opposite surfaces of the ceramic diaphragm. A resistance value of the at least one resistor varies depending upon an amount of deformation of the ceramic diaphragm caused by the pressure of the measurement fluid. In this case, the pressure is measured by the resistance value.

In a still further form of the invention, the strain detector means comprises a first electrode formed on the other of the opposite surfaces of the ceramic diaphragm, and a second electrode which is fixedly positioned in spaced-apart relationship with the first electrode and electrically insulated from the first electrode. A static capacity between the first and second electrodes varies depending upon an amount of deformation of the ceramic diaphragm caused by the pressure of the measurement fluid. In this case, the pressure is measured by the static capacity.

BRIEF DESCRIPTION OF THE DRAWINGS

The above and other objects, features and advantages of the present invention will become more apparent by reading the following detailed description of presently preferred embodiments of the invention, when considered in connection with the accompanying drawings, in which.

DETAILED DESCRIPTION OF THE PREFERRED EMBODIMENTS

Figure 1:
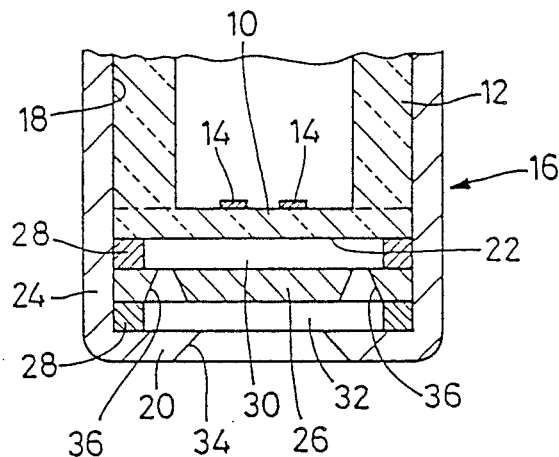
FIG. 1 is a fragmentary elevational view in longitudinal cross section of one embodiment of a pressure sensor of the present invention.
Figure 2:
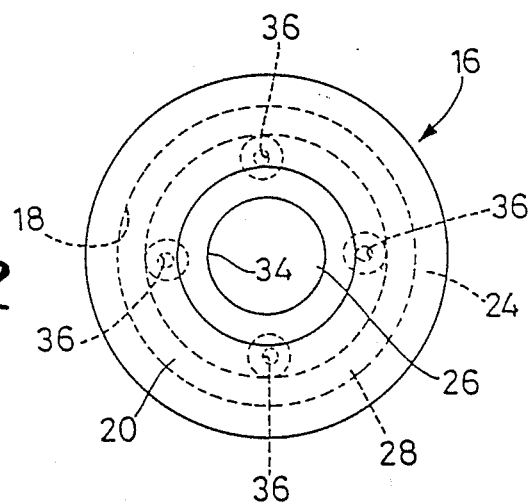
FIG. 2 is a plan view of the pressure sensor of FIG. 1.

Referring first to the elevational and plan views of FIGS. 1 and 2, reference numeral 10 generally denotes a ceramic diaphragm of a pressure sensor, which is deformable in response to a pressure applied thereto. The ceramic diaphragm 10 is a round planar or plate-like member made of a ceramic material, which is formed integrally with a cylindrical support body 12 also made of a ceramic material. Described more specifically, the ceramic diaphragm 10 and the support body 12 are formed such that one end portion of the support body 12 terminates in the outer peripheral portion of the ceramic diaphragm 10, at an inner surface of the diaphragm. Thus, the ceramic diapahragm 10 is supported by or secured to the support body 12.

The integral structure of the diaphragm 10 and support body 12 is formed of a suitable known ceramic material such as alumina, zirconia, mullite and silicon nitride, by a known technique. An unfired formed mass of the ceramic material is fired into the ceramic structure 10, 12. While the diaphragm 10 and the support body 12 may be formed and fired separately and then joined together into the integral structure 10, 12 by a glass or other bonding material, it is desirable that an integral formed ceramic mass is fired into the ceramic structure 10, 12, as proposed in copending U.S. patent application Ser. No. 07/197,312 (filed May 23, 1988), from the standpoint of heat and pressure resistances, and sensing accuracy of the pressure sensor.

On the inner surface of the ceramic diaphragm 10 at which the diaphragm 10 and the support body 12 are joined together, there are formed a plurality of resistors 14 and electrically conductive strips (not shown) which connect the resistors 14 in a bridge arrangement as known in the art, so as to form a Wheatstone bridge circuit, for example. These resistors 14 and conductive strips are formed by printing or other technique, by using suitable electrically resistive and conductive materials, before or after the diaphragm 10 is fired. The bridge arrangement or circuit formed by the resistors 14 and the conductive strips serves as a strain detector means for detecting a strain which occurs in the ceramic diaphragm 10.

When the ceramic diaphragm 10 is stressed and deformed, the resistance values of the resistors 14 decrease or increase, and an output of the bridge circuit is fed to an external device, to measure an amount of strain which represents the pressure or stress applied to the diaphragm 10. While the resistors 14 and the conductive strips may be formed of any materials used in the art, it is preferable to use a mixture which consists substantially of a selected electrically conductive component having excellent high-temperature characteristics, and a selected dielectric component consisting of a glass or ceramic material, so that the bridge circuit is highly durable under high-temperature environments.

The ceramic diaphragm 10 and the support body 12 are fixedly accommodated in an opening 18 in a cylindrical metallic housing 16, such that the ceramic diaphragm 10 is spaced apart from a bottom wall 20 of the housing 16 in the longitudinal direction of the housing. In other words, the integral structure of the diaphragm 10 and support body 12 is fixed in a cylindrical wall 24 of the metallic housing 16 such that a lower surface 22 of the ceramic diaphragm 10, remote from the support body 12, faces the inner surface of the bottom wall 20 of the housing 16, in a spaced-apart relationship with each other.

In the opening 18 of the cylindrical metallic housing 16, there is also disposed a partition disk 26 at an intermediate position between the ceramic diaphragm 10 and the bottom wall 20 in the longitudinal direction of the housing 16, such that the partition disk 26 divides a chamber defined between the diaphragm 10 and the bottom wall 20, into two parts, i.e., a first space 30 on the side of the diaphragm 10, and a second space 32 on the side of the bottom wall 20. This partition disk 26 is held in position by and between a pair of annular metallic spacers 28, one disposed between the diaphragm 10 and the partition disk 26, and the other disposed between the partition disk 26 and the bottom wall 20.

In the arrangement described above, the lower or outer surface 22 of the ceramic diaphragm 10 is exposed to the first space 30, defined by the upper annular spacer 28, partition disk 26 and diaphragm 10. Further, the second space 32 is defined by the partition disk 26, lower annular spacer 28 and bottom wall 20.

The bottom wall 20 of the cylindrical housing 16 has a tapered round aperture 34 formed through a radially central portion thereof. This aperture 34 has a comparatively large average diameter. As indicated in FIG. 2, the partition disk 26 has four tapered round apertures 36 formed through radially outer portions thereof. These apertures 36 are equally spaced apart from each other in the circumferential direction of the partition disk 26, and have a comparatively small average diameter. In this arrangement, the first space 30 to which the lower or outer surface 22 of the ceramic diaphragm 10 is exposed is held in communication with the second space 32 through the small-diameter apertures 36, and the second space 32 communicates with the ambient atmosphere through the large-diameter aperture 34. Thus, the lower surface 22 of the diaphragm 10 communicates with the ambient atmosphere through the first space 30, small-diameter apertures 36, second space and large-diameter aperture 34.

It follows from the above description that the partition disk 26 and the bottom and cylindrical walls 20, 24 of the housing 16 cooperate with each other to constitute a baffling structure with respect to a flow of the ambient atmosphere through the chamber defined between the bottom wall 20 and the diaphragm 10. The large-diameter aperture 34 and the small-diameter apertures 36 serve as communication holes.

It will be understood that the large-diameter aperture 34 and the small-diameter apertures 36 are spaced from each other in the radial direction of the bottom wall and partition disk 20, 26, as indicated in FIGS. 1 and 2. It is noted that the small-diameter apertures 36 are open to a radially outer portion of the first space 30 corresponding to a radially outer portion of the ceramic diaphragm 10 at which the diaphragm 10 is secured to the cylindrical support body 12. Namely, the apertures 36 are aligned with the radially outer portion of the diaphragm 10 which experiences substantially no deformation in response to a pressure applied to the lower surface 22.

For example, the instant pressure sensor constructed as described above may be used to detect or measure a pressure within a cylinder of an internal combustion engine. In this instance, the pressure sensor is positioned such that the large-diameter aperture 34 communicates with the cylinder bore. With the cylinder pressure applied to the ceramic diaphragm 10, the amount of deformation or strain of the diaphragm 10 varies with the cylinder pressure, whereby the output of the bridge circuit, including the resistors 14, varies with the cylinder pressure. Thus, the cylinder pressure may be detected by the sensor.

In the present pressure sensor, the bottom wall 20 of the cylindrical housing 16 and the partition disk 26 disposed therein prevent the lower surface 22 of the ceramic diaphragm 10 from being directly exposed to a straightforward flow of the atmosphere within the cylinder bore of the engine. That is, a stream of the atmosphere (combustion gas and intake gas in the cylinder) should pass through the large-diameter aperture 34, to enter the second space 32, and also through the small-diameter apertures 36, to enter the first space 30 to which the ceramic diaphragm 10 is exposed. Since the small-diameter apertures 36 are spaced away from the central large-diameter aperture 34 in the radially outward direction of the partition disk 26, the flow of the gas is effectively baffled by the partition disk 26. In this manner, the ceramic diaphragm 10 is protected against direct exposure to the straightforward flow of the gas from the cylinder bore of the engine.

The above baffling structure reduces or mitigates an amount of thermal stress of the ceramic diaphragm 10 due to a sudden change in the temperature of the atmosphere in the first space 30, which would otherwise occur by alternate exposures of the sensor to the hot combustion gas and the cool intake gas. In other words, the baffling structure minimizes an amount of deformation or strain of the ceramic diaphragm 10 caused by the thermal stress, thus assuring improved accuracy of measurement of the pressure in the cylinder bore.

Further, since the thermal stresses of the ceramic diaphragm 10 and the other members of the sensor are minimized by the baffling structure, the durability of the diaphragm 10 and the sensor itself is effectively increased.

The instant pressure sensor is also advantageous in that the radially inner working area or portion of the ceramic diaphragm 10 is protected against a sudden change in the temperature, since the small-diameter apertures 36, formed through the partition disk 26, are located in alignment with the radially, outer, non-working portion of the diaphragm 10 which experiences substantially no deformation.

Figure 3:
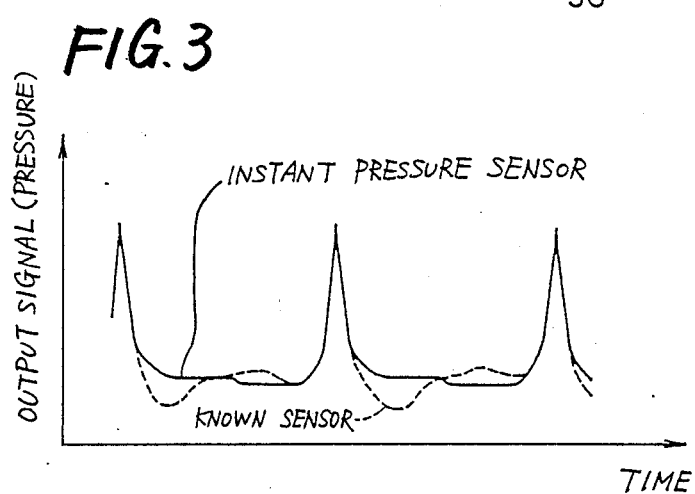
FIG. 3 is a graph showing output signals of the pressure sensor of FIG. 1 and a known pressure sensor, which represent pressures within a cylinder bore of an internal combustion engine.

An experiment was conducted on the present pressure sensor to measure the pressure in the cylinder bore of an internal combustion engine. The experiment revealed that the output of the sensor accurately represented an actual change of the pressure in the cylinder bore, as indicated by a solid line in FIG. 3. A dashed line in FIG. 3 indicates a change in the output level of a conventional pressure sensor wherein a ceramic diaphragm is adapted to be exposed directly to a straightforward flow of the gas from the cylinder bore. It will be understood from the graph of FIG. 3 that there exists a measuring error in the conventional pressure sensor.

Figure 4:
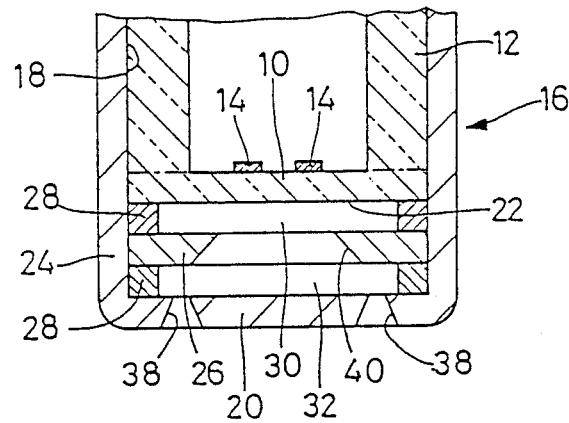
FIGS. 4, 5 and 6 are fragmentary elevational views corresponding to that of FIG. 1, illustrating modified embodiments of the present invention.
Figure 5:
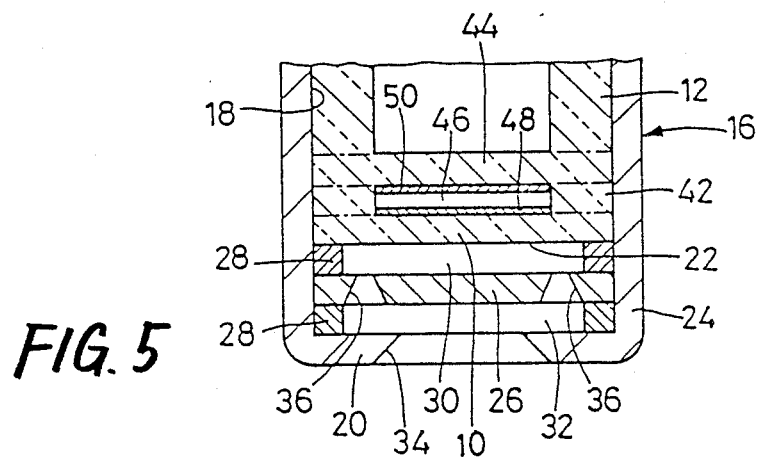

Referring next to FIGS. 4 and 5, there are illustrated modified embodiments of the present invention. In the interest of brevity and simplification, the same reference numerals used in FIGS. 1 and 2 will be used in FIGS. 4 and 5, to identify the functionally corresponding components, and no redundant description of these components will be provided.

The pressure sensor of FIG. 4 is different from the preceding embodiment in the baffling arrangement. Described more specifically, the bottom wall 20 of the cylindrical housing 16 has a plurality of small-diameter apertures 38 formed through radially outer portions thereof, such that the apertures 38 are spaced apart from each other in the circumferential direction of the cylindrical housing 16. On the other hand, the partition disk 26 has a large-diameter aperture 40 formed in a radially central portion thereof, so that the peripheral portion of the large-diameter aperture 40 is radially inwardly spaced from the centers of the small-diameter apertures 38. In this arrangement, the first space 30 to which the ceramic diaphragm 10 is directly exposed communicates with the second space 32 through the large-diameter aperture 40, and the second space 32 communicates with the ambient atmosphere through the small-diameter apertures 38.

In the present modified embodiment also, a flow of the atmosphere toward the lower or outer surface of the ceramic diaphragm 10 is baffled by the bottom wall 20 and the partition disk 26. Therefore, the working portion of the diaphragm 10 is protected against direct exposure to a straightforward flow of the atmosphere and, consequently, is protected from a sudden change in the temperature of the atmosphere within the first space 30, which would otherwise occur where the atmosphere consists of a hot combustion gas and cool intake gas of an internal combustion engine, for example.

The pressure sensor of FIG. 5 is different from the preceding embodiments in the arrangement of the strain detector means for detecting an amount of strain or deformation of the ceramic diaphragm as an electrical output. Described more particularly, the ceramic cylindrical support body 12 is formed with a ceramic disk-like base 44, and a ceramic annular spacer 42 and the ceramic diaphragm 10, which are integrally laminated on each other such that the base 44 closes the lower end of the support body 12, and such that the annular spacer 42 is sandwiched by and between the base 44 and the diaphragm 10. Namely, the ceramic diaphragm 10 is secured to the support body 12 through the spacer 42 and the base 44.

In the above arrangement, mutually facing central portions of the base 44 and the diaphragm 10 are spaced apart from each other by a suitable distance by the annular spacer 42, such that a cavity 46 is defined by these central portions of the base and diaphragm 44, 10 and the annular spacer 42. The cavity 46 communicates with the ambient atmosphere, or is enclosed fluid-tight enclosed.

The spacer 42 and the base 44 are formed of a suitable ceramic material such as alumina, zirconia, mullite and silicon nitride. An unfired, formed, ceramic mass of the spacer 42 and base 44 is prepared separately from or integrally with an unfired, formed mass of the diaphragm 10, and is sintered in a suitable known manner. For efficient manufacture and improved durability of the sensor, it is desirable to prepare and fire an unfired ceramic laminar structure which consists of laminated green sheets for the diaphragm 10, spacer 42 and base 44.

The diaphragm 10 and the base 44 have respective first and second electrodes 48, 50 formed on the facing surfaces that define the cavity 46. These first and second electrodes 48, 50 are formed of platinum, gold, silver, palladium or other conductive materials, by printing on the surfaces of the fired diaphragm 10 and base 44 before the members are joined together, or on the surfaces of the respective green sheets for the diaphragm 10 and base 44 before the green sheets for the diaphragm 10, spacer 42 and base 44 are laminated onto each other.

Thus, the first and second electrodes 48, 50 are positioned in spaced-apart relationship with each other so that the electrodes 48, 50 are electrically insulated from each other. When a pressure is applied to the ceramic diaphragm 10, the distance between the two electrodes 48, 50 varies due to deformation of the diaphragm 10, whereby the electrostatic capacity between the two electrodes 48, 50 varies as a function of the amount of deformation of the diaphragm 10. Consequently, the pressure applied to the ceramic diaphragm 10 can be measured or determined by detecting the static capacity between the first and second electrodes 48, 50.

Like the preceding embodiments of FIGS. 1 and 4 employing the bridge circuit 14, the pressure sensor of FIG. 5, employing the above-described strain detector means, may be used for measuring the pressure at a desired location, for example, the pressure in the cylinder bore of an internal combustion engine. The instant pressure sensor has the same baffling structure as the first embodiment of FIG. 1.

While the present invention has been described in its presently preferred embodiments for illustrative purpose only, it is to be understood that the invention is not limited to the details of the illustrated embodiments.

Figure 6:
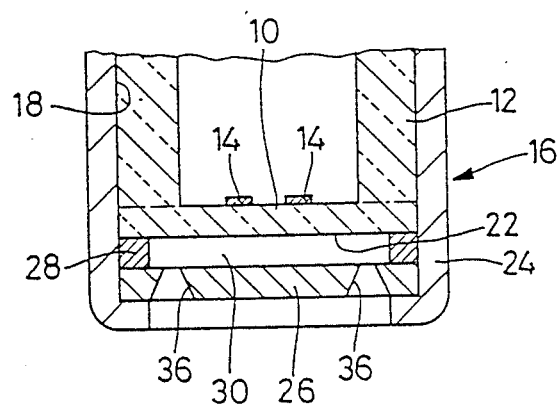

For instance, the baffling structure provided on the pressure sensor is not limited to those of the illustrated embodiments wherein the two baffleplate members (bottom wall 20 and partition disk 26) are used. It will be understood that the baffling structure may use a single baffleplate member, or three or more baffleplate members. Where a single baffleplate is used, the apertures 36 should be formed in a radially outer portion thereof, as illustrated in FIG. 6, such that the central working portion of the ceramic diaphragm 10 is protected against direct exposure to a straightforward flow of the atmosphere to be measured.

Further, the baffling structure may be modified such that the communication holes are formed through the cylindrical wall 24 of the housing 16, rather than through the bottom wall 20 and the partition disk 26.

The several embodiments of the pressure sensor illustrated above are all characterized by the baffling structure for protecting the ceramic diaphragm 10. Therefore, the other parts or functional means of the sensor such as the strain detector means are not limited to the specific configurations or arrangements illustrated above, and may be changed or modified as needed. It will be further understood that the baffling structure may be formed of a suitable material other than those indicated above with respect to the illustrated embodiments.

While the illustrated embodiments are adapted to measure the pressure in the cylinder bore of an internal combustion engine, the pressure sensor constructed according to the invention may find other applications. In particular, the instant pressure sensor is suitable for measuring the pressure of an atmosphere or fluid whose temperature changes to a considerable extent.

It will be obvious that the present invention may be embodied with various other changes, modifications and improvements which may occur to those skilled in the art, without departing from the spirit and scope of the invention defined in the following claims.

What is claimed is:

1. A pressure sensor having a ceramic diaphragm which is exposed at one of opposite surfaces thereof to a measurement fluid in an external space and deformable in response to a pressure of said measurement fluid, and strain detector means for producing an electrical output representative of an amount of deformation of the ceramic diaphragm, said pressure sensor comprising:

a support member for fixedly supporting said ceramic diaphragm at a peripheral portion of said diaphragm, so as to allow a central working portion of said diaphragm to be deformed in response to the pressure of said measurement fluid applied thereto; and a baffling structure disposed adjacent said one surface of said ceramic diaphragm, and including portions which cooperate with said one surface to define a chamber to which said one surface of the ceramic diaphragm is exposed, said baffling structure having at least one communication hole for communication between said chamber and said external space, said at least one communication hole including at least one aperture formed through a portion of said baffling structure which faces said one surface of the ceramic diaphragm, said at least one aperture being substantially aligned with said support member such that said one surface of said central working portion of said ceramic diaphragm is protected against direct exposure to a straightforward flow of said measurement fluid from said external space toward said central working portion of the diaphragm.

2. The pressure sensor of claim 1, wherein said baffling structure comprises a plurality of baffleplate members which are spaced apart from each other and from said one surface of said ceramic diaphragm, in a direction substantially perpendicular to said one surface, said at least one communication hole consisting of at least one communication hole formed through a thickness of each of said plurality of baffleplate members, such that said at least one communication hole formed through one of said baffleplate members is spaced from said at least one communication hole formed through another of said baffleplate members, in a direction substantially parallel to said one surface of said ceramic diaphragm.

3. The pressure sensor of claim 2, wherein said plurality of baffleplate members consist of two baffleplate members.

4. The pressure sensor of claim 3, wherein one of said two baffleplate members consists of a bottom wall of a housing in which said support member, said ceramic diaphragm and the other baffleplate member are accommodated, said other baffleplate member dividing said chamber into two spaces which communicate with each other through said at least one communication hole formed through said other baffleplate member.

5. The pressure sensor of claim 1, wherein said baffling structure comprises a single baffleplate member which is spaced apart from said one surface of said ceramic diaphragm, in a direction substantially perpendicular to said one surface, said at least one communication hole being aligned with a portion of said ceramic diaphragm near said outer portion.

6. The pressure sensor of claim 5, wherein said single baffleplate member consists of a bottom wall of a housing in which said support member and said ceramic diaphragm are accommodated.

7. The pressure sensor of claim 1, wherein said said strain detector means comprises at least one resistor formed on another of said opposite surfaces of said ceramic diaphragm, a resistance value of said at least one resistor varying depending upon an amount of deformation of said ceramic diaphragm caused by said pressure of the measurement fluid, whereby said pressure is measured by said resistance value.

8. The pressure sensor of claim 1, wherein said strain detector means comprises a first electrode formed on another of said opposite surfaces of said ceramic diaphragm, and a second electrode fixedly positioned in spaced-apart relationship with said first electrode and electrically insulated from said first electrode, a static capacity between said first and second electrodes varying depending upon an amount of deformation of said ceramic diaphragm caused by said pressure of the measurement fluid, whereby said pressure is measured by said static capacity.

* * * * *